United States Patent [19]

Käser

[11] Patent Number: 5,635,607

[45] Date of Patent: Jun. 3, 1997

[54] CATIONIC OR BASIC AZO DYES CONSISTING OF AN AMINO BENZOTHIAZOLE DIAZO COMPONENT AND A DISUBSTITUTED ANILINE COMPONENT, WHICH DYES CONTAIN AT LEAST ONE AROMATIC RADICAL

[75] Inventor: Adolf Käser, Bottmingen, Switzerland

[73] Assignee: Ciba-Geigy Corporation, Tarrytown, N.Y.

[21] Appl. No.: 426,765

[22] Filed: Apr. 21, 1995

[30] Foreign Application Priority Data

Apr. 26, 1994 [CH] Switzerland ............... 1285/94-5

[51] Int. Cl.$^6$ ............. C09B 29/36; C09B 44/08; C09B 44/10; C09B 62/085
[52] U.S. Cl. ............ 534/611; 534/635; 534/776; 534/788; 534/610; 534/589; 162/162
[58] Field of Search .................. 534/611, 635, 534/776, 788, 610; 162/162

[56] References Cited

U.S. PATENT DOCUMENTS

| | | | |
|---|---|---|---|
| 2,832,764 | 4/1958 | Huenigi | 534/611 X |
| 2,857,371 | 10/1958 | Straley et al. | 534/788 X |
| 2,889,315 | 6/1959 | Bossard et al. | 534/611 |
| 2,951,847 | 9/1960 | Baumann, III et al. | 260/305 |
| 3,043,828 | 7/1962 | Huenig, II | 534/611 |
| 3,078,137 | 2/1963 | Baumann, I et al. | 534/611 X |
| 3,086,002 | 4/1963 | Baumann, II et al. | 534/611 X |
| 3,102,878 | 9/1963 | Baumann, III et al. | 534/788 X |
| 3,132,132 | 5/1964 | Suzuki et al. | 260/158 |
| 3,132,133 | 5/1964 | Randall | 534/611 |
| 3,843,624 | 10/1974 | Seiler et al. | 534/788 X |
| 3,991,043 | 11/1976 | Illy | 534/611 X |
| 4,002,604 | 1/1977 | Fawkes et al. | 534/611 X |
| 4,051,084 | 9/1977 | Kuhltahau et al. | 260/158 |
| 4,382,801 | 5/1983 | Loew | 8/538 |

FOREIGN PATENT DOCUMENTS

| | | | |
|---|---|---|---|
| 2224788 | 4/1973 | Germany | 534/611 |
| 2232542 | 1/1974 | Germany | 534/611 |
| 2822912 | 11/1979 | Germany | 534/611 |
| 3103110 | 8/1982 | Germany | 534/611 |
| 787369 | 12/1957 | United Kingdom | 534/611 |
| 4251440 | 2/1981 | United Kingdom | 534/611 X |

OTHER PUBLICATIONS

Chemical Abstracts — 92: 130497c (DE–A2,822,912) (1980).

Chemical Abstracts — 97: 199545n (DE–A3,103,110) (1992).

*Primary Examiner*—Floyd D. Higel
*Attorney, Agent, or Firm*—Kevin T. Mansfield

[57] ABSTRACT

The cationic or basic aminobenzothiazole dyes disclosed herein are particularly suitable for dyeing paper.

Paper is dyed with these dyes in blue or violet shades of good fastness properties.

20 Claims, No Drawings

CATIONIC OR BASIC AZO DYES CONSISTING OF AN AMINO BENZOTHIAZOLE DIAZO COMPONENT AND A DISUBSTITUTED ANILINE COMPONENT, WHICH DYES CONTAIN AT LEAST ONE AROMATIC RADICAL

The present invention relates to novel cationic or basic unsulfonated azo dyes, to processes for their preparation and to the use thereof for dyeing textile materials and, in particular, paper.

The novel azo dyes have the formula

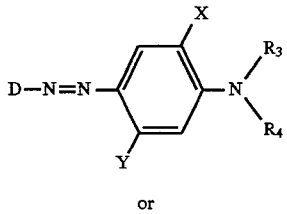

(1)

or

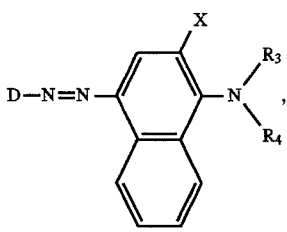

(2)

wherein

D is a radical of a diazo component of formula

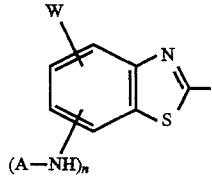

(3)

or

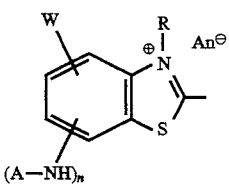

(4)

wherein

A is an aromatic heterocyclic radical, arylcarbonyl or arylaminocarbonyl,

W is halogen, alkyl, alkoxy, carboxy, alkanoylamino, arylamino, arylcarbonylamino or arylureido, R is alkyl, $An^{\ominus}$ is a colourless anion, and n is 0 or 1, X is hydrogen, alkyl or alkoxy, Y is hydrogen, alkyl, alkoxy, alkanoylamino, arylcarbonylamino or arylureido, $R_3$ is hydrogen or alkyl, $R_4$ is hydrogen, alkyl, cycloalkyl or aryl, or $R_3$ and $R_4$, together with the linking N-atom, forms an unsubstituted or substituted 5-, 6- or 7-membered ring which may contain further hetero atoms, with the proviso that n may only be 0 if $R_4$ or the ring formed by $-NR_3R_4$ contains an aromatic carbocyclic or heterocyclic ring as substituent.

Alkyl radicals in this specification will be quite generally understood as meaning straight-chain, branched or cyclic alkyl groups. Cycloalkyl preferably contains 5 to 8 carbon atoms, and open-chain alkyl preferably contains 1 to 8, most preferably 1 to 4, carbon atoms.

Unbranched or branched open-chain alkyl will typically be: methyl, ethyl, n- and isopropyl, n-, sec- or tert-butyl, n- and isopentyl, n- and isohexyl or 2-ethylhexyl.

These alkyl radicals may carry one or more than one substituent, e.g., those selected from the group consisting of hydroxy, carboxy, halogen, cyano, $C_1$–$C_4$alkoxy, hydroxy-substituted $C_1$–$C_4$alkoxy, amino, alkylamino, dialkylamino, aminocarbonyl, phenyl, phenoxy and phenylaminocarbonyl, in which three last mentioned radicals the phenyl group may in turn be substituted by $C_1$–$C_4$alkyl, $C_1$–$C_4$alkoxy or phenoxy. Furthermore, the alkyl radicals may be substituted by cationic radicals, typically by trialkylammonium or pyridinium radicals. Illustrative examples of such cationic radicals are trimethylammonium, triethylammonium, trihydroxyethylammonium, pyridinium or 3-alkylpyridinium.

Illustrative examples of suitable radicals of this kind are: hydroxyethyl, 2-hydroxyprop-1-yl, 1-hydroxyisopropyl, 2-hydroxyisopropyl, 2,3-dihydroxyprop-1-yl, methoxyethyl, ethoxymethyl, methoxycarbonyloxyethyl, chloroethyl, cyanoethyl, benzyl, 1-phenylethyl, 2-phenylethyl, dimethylaminoethyl, diethylaminoethyl, hydroxyethylaminoethyl, dihydroxyethylaminoethyl, methoxycarbonylethyl or aminocarbonylethyl.

Illustrative examples of suitable alkyl radicals which are substituted by cationic groups are: trimethylammoniumethyl, triethylammoniumethyl, trihydroxyethylammoniumethyl, trihydroxyethylammoniumpropyl, pyridiniumethyl, 4-methylpyridiniumethyl, 2-hydroxy-trimethylammoniumpropyl, trimethylammoniummethylcarbonylaminoethyl, dimethylhydroxyethylammoniumethyl, tris(2-hydroxypropyl) ammoniummethyl, dimethyl-2-hydroxypropylammoniumethyl, dimethyl-2-cyanoethylammoniumethyl, dimethyl-2-chloroethylammoniumethyl, dimethyl-2-methoxyethylammoniumethyl, methyl-dihydroxyethylammoniumethyl, methyl-di-2-hydroxyproylammoniumethyl, N-methylmorpholiniumethyl and N-methylpiperidiniumethyl.

Cycloalkyl is in particular cyclopentyl and cyclohexyl; and the suitable substituent is in particular $C_1$–$C_4$alkyl, especially $CH_3$.

Suitable alkoxy radicals are preferably those containing 1 to 4 carbon atoms, typically methoxy, ethoxy, propoxy, isopropoxy, n-butoxy, isobutoxy or tert-butoxy. These alkoxy radicals may be substituted, conveniently by the radicals cited as substituents of the alkyl groups, preferably by hydroxy or $C_1$–$C_4$alkoxy. Illustrative examples of substituted alkoxy radicals are hydroxyethoxy, methoxyethoxy, 2-hydroxypropoxy, 1,2-dihydroxyprop-3-oxy or 1,2-dimethoxyprop-3-oxy.

Halogen will typically be taken to mean fluoro, bromo, iodo or, preferably, chloro.

Aryl radicals will be understood as meaning in this specification quite generally aromatic or heteroaromatic radicals, but preferably naphthyl or, most preferably, phenyl radicals. All these radicals may be unsubstituted or substituted. Suitable substituents are typically $C_1$–$C_4$alkyl, $C_1$–$C_4$alkoxy, bromo, chloro, nitro, cyano, carboxy or $C_1$–$C_4$alkylcarbonylamino. The particularly preferred meaning of aryl is, however, phenyl.

A in the radicals D of formula (3) or (4) is an aromatic heterocyclic radical, arylcarbonyl or arylaminocarbonyl. Suitable aromatic heterocyclic radicals are in particular the colourless heterocyclic radicals which are used in the preparation of reactive dyes for textile materials. They are preferably triazine, pyrazine, pyrimidine or quinoxaline radicals which carry one or more than one halogen atom which can be replaced by reaction with a radical containing a OH—, SH— or NH group. Arylcarbonyl or arylaminocarbonyl is preferably phenylcarbonyl or phenylaminocarbonyl, the phenyl moiety of which may be substituted as indicated above.

Those novel dyes are particularly preferred wherein A is a radical of formula

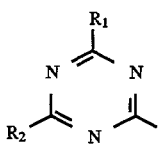 (5)

wherein $R_1$ and $R_2$ are each independently of the other halogen, hydroxy, alkoxy, alkylthio, amino, alkylamino, dialkylamino, arylamino, piperidino or morpholino.

Particularly suitable radicals $R_1$ and $R_2$ are halogen, amino, $C_1$–$C_4$alkylamino, di-$C_1$–$C_4$alkylamino, phenylamino or morpholino, and the alkyl moieties of the alkylamino groups radicals may be substituted as indicated above. Particularly suitable radicals $R_1$ and $R_2$ are methylamino, ethylamino, hydroxyethylamino, dihydroxyethylamino, hydroxypropylamino, hydroxyisopropylamino, methoxyethylamino, methoxypropylamino, hydroxyethoxyethylamino, methoxyethoxyethylamino, dimethylaminoethylamino, dimethylaminopropylamino, diethylaminoethylamino, diethylaminopropylamino, aminoethylamino, 2-aminopropylamino, 4-aminoethylpiperazino, 4-hydroxyethylpiperazino, phenylamino or morpholino.

$R_1$ and $R_2$ preferably have the same meaning and are each preferably hydroxyethylamino or dihydroxyethylamino.

In the dyes of this invention, W in the diazo component of formula (3) or (4) is preferably chloro, bromo, $C_1$–$C_4$alkyl, $C_1$–$C_4$alkoxy, acetylamino, benzoylamino or phenylureido.

Particularly useful dyes of this invention are those of formula (1) and, among these, those dyes are particularly preferred in which D is a cationic radical of formula (4).

The anion $An^\ominus$ in the radicals of formula (4) is suitably an inorganic as well as an organic anion, typically including: halide, e.g. chloride, bromide or iodide, sulfate, methyl sulfate, boron tetrafluoride, aminosulfonate, perchlorate, carbonate, bicarbonate, phosphate, phosphoromolybdate, phosphorotungstate, phosphorotungstomolybdate, benzenesulfonate, naphthalenesulfonate, 4-chlorobenzenesulfonate, oxalate, maleate, acetate, propionate, lactate, succinate, chloroacetate, tartrate, methanesulfonate or benzoate ions, or a complex anion, such as the anion of zinc chloride double salts.

The anion will usually be determined by the process for the preparation of the dyes. The dyes preferably contain the anion as chloride, hydrogensulfate, sulfate, methosulfate, phosphate, formate, lactate or acetate. The anion can be exchanged in known manner for another anion.

If the dyes of this invention carry further cationic groups, then they contain as additional anions preferably those listed above.

R is preferably unsubstituted $C_1$–$C_4$alkyl or $C_1$–$C_4$alkyl which is substituted by hydroxy, phenyl or aminocarbonylethyl.

The preferred meaning of X is hydrogen, $C_1$–$C_4$alkyl or $C_1$–$C_4$alkoxy, hydrogen being most preferred.

Y is preferably hydrogen, $C_1$–$C_4$alkyl, $C_1$–$C_4$alkoxy or $C_1$–$C_4$alkylcarbonylamino. Particularly preferred meanings of Y are hydrogen, methyl, methoxy and acetylamino.

$R_3$ and $R_4$ are preferably each independently of the other unsubstituted $C_1$–$C_4$alkyl or $C_1$–$C_4$alkyl which is substituted by hydroxy, chloro, cyano, $C_1$–$C_4$alkoxy, $C_1$–$C_4$alkoxycarbonyl, $C_1$–$C_4$alkylcarbonyloxy, carboxamido, phenyl, amino, monoalkylamino, dialkyamino or trialkylammonium, and the alkyl moieties of the alkylamino groups may likewise be substituted by the same substituents.

If —$NR_3R_4$ is a 5-, 6- or 7-membered ring, said ring is preferably a a pyrrolidino, piperidino, morpholino or piperazino ring. The piperazino ring can be substituted at the N atom which is not linked to the coupling component, typically by alkyl, arylcarbonyl, arylaminocarbonyl, benzothiazolyl, benzothioazolylaryl or, in particular, by an aromatic carbocyclic or heterocyclic radical. Most preferably $R_3$ and $R_4$ are a piperazino radical of formula

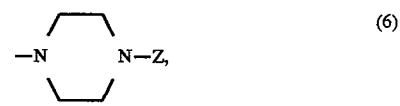 (6)

wherein

Z is a radical A as defined for formulae (3) and (4), or is an unsubstituted or substituted aryl radical.

In particularly preferred dyes of this invention Z is a radical of formula

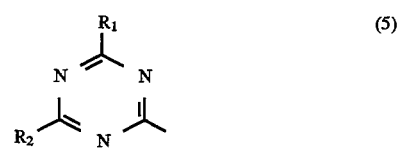 (5)

wherein $R_1$ and $R_2$ are each independently of the other halogen, hydroxy, alkoxy, alkylthio, amino, alkylamino, dialkylamino, arylamino, piperidino or morpholino, or a phenyl or naphthyl radical which is unsubstituted or substituted by $C_1$–$C_4$alkyl or by 1,3-benzothiazol-2-yl; or are phenylcarbonyl, phenylaminocarbonyl or 1,3-benzothiazol-2-yl.

Particularly preferred dyes of this invention are those of formula

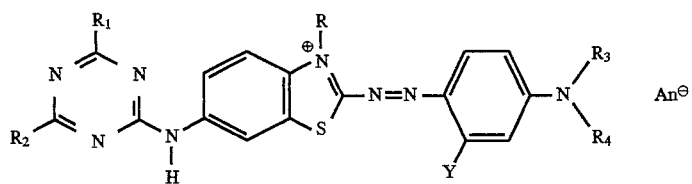

or

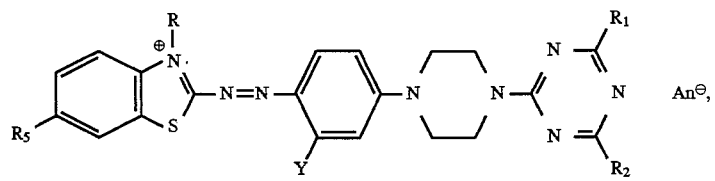

wherein $R_1$ and $R_2$ are each independently of the other halogen, hydroxy, alkoxy, alkylthio, amino, alkylamino, dialkylamino, arylamino, piperidino or morpholino, R is unsubstituted $C_1$–$C_4$alkyl or $C_1$–$C_4$alkyl which is substituted by hydroxy, phenyl or aminocarbonylethyl, Y is hydrogen, $C_1$–$C_4$alkyl, $C_1$–$C_4$alkoxy or $C_1$–$C_4$alkylcarbonylamino, $R_3$ and $R_4$ are each independently of the other unsubstituted $C_1$–$C_4$alkyl or $C_1$–$C_4$alkyl which is substituted by hydroxy, chloro, cyano, $C_1$–$C_4$alkoxy, $C_1$–$C_4$alkoxycarbonyl, $C_1$–$C_4$alkylcarbonyloxy, carboxamido, phenyl, amino, monoalkylamino, dialkyamino or trialkylammonium, and the alkyl moieties of the alkylamino groups may likewise be substituted by the cited substituents, $R_5$ is hydrogen, $C_1$–$C_4$alkyl, $C_1$–$C_4$alkoxy, $C_1$–$C_4$alkylcarbonylamino, phenylcarbonylamino or phenylureido and $An^\ominus$ is a colourless anion.

The dyes of formulae (1) and (2) are prepared in a manner known per se, typically by diazotising an amine of formula

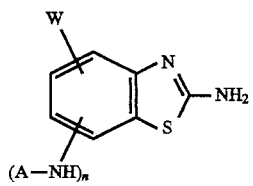

(9)

coupling the resultant diazo compound with a coupling component of formula

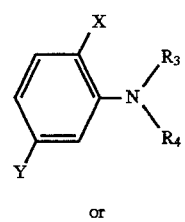

(10)

or

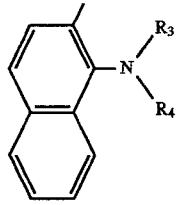

(11)

and, if necessary, quaternising the resultant dye in known manner with a quaternising agent R-An, wherein X, Y, $R_3$, $R_4$, W, A, n and R are as defined for formulae (1) to (4) and An is a radical which can be converted in the quaternisation into the anion $An^\ominus$.

The diazotisation of the compound of formula (9) is carried out in per se known manner, typically with sodium nitrite in acidic, e.g. sulfuric acid, aqueous medium. The diazotisation can, however, also be carried out with other diazotising agents, e.g. with nitrosylsulfuric acid. The reaction medium may contain an additional acid, typically phosphoric acid, sulfuric acid, formic acid, acetic acid, hydrochloric acid, or a mixture of these acids, e.g. a mixture of phosphoric acid and acetic acid. The diazotisation is conveniently carried out in the temperature range from −10° to 30° C., e.g. from −10° C. to room temperature.

The coupling of the diazotised compound of formula (9) to the coupling component of formula (10) or (11) is likewise carried out in known manner, typically in acidic, aqueous or aqueous-organic medium, preferably in the temperature range from −10° to 30° C., most preferably in the range below 10° C. The acids used are typically hydrochloric acid, acetic acid, sulfuric acid or phosphoric acid. Diazotisation and coupling can be carried out in a one-pot process, i.e. in the same reaction medium.

Quaternisation is conveniently carried out in an inert organic solvent, for example in a hydrocarbon, chlorinated hydrocarbon or nitrohydrocarbon, typically including benzene, toluene, xylene, tetrachloroethane, chloroform, carbon tetrachloride, mono- or dichlorobenzene or nitrobenzene, in an acid amide or acid anhydride such as dimethyl formamide, N-methylacetamide or acetic anhydride, in dimethyl sulfoxide or in a ketone such as acetone or methyl ethyl ketone. Instead of an organic solvent, it is also possible to use an excess of the alkylating agent. The reaction can, however, also be carried out in aqueous medium, e.g. in aqueous suspension, or in glacial acetic acid. It is expedient to carry out the quaternisation at elevated temperature, e.g. in the temperature range from c. 50 to 130° C. if the reaction is carried out in an organic solvent or in pure dimethyl sulfate, or from c. 20 to 60° C. if the reaction is carried out in aqueous phase. The quaternisation may be carried out with the addition of an acid acceptor, for example an inorganic base, e.g. NaOH or KOH, sodium acetate, magnesium oxide, magnesium carbonate, sodium carbonate, calcium carbonate or sodium bicarbonate and under atmospheric or superatmospheric pressure. The most favourable conditions for the particular case can be readily determined by experimentation.

Known quaternising agents R-An which introduce the radical R and whose radical An is converted into the anion $An^{\ominus}$ are used for the quaternisation. Typical examples of quaternising agents R-An are: alkyl halides, alkyl esters of sulfuric acid or alkyl esters of organic sulfonic acids, for example methyl chloride, methyl bromide or methyl iodide, ethyl chloride, ethyl bromide or ethyl iodide, propyl bromide or propyl iodide, butyl bromide, dimethyl sulfate, diethyl sulfate, dibutyl sulfate, methyl benzenesulfonate, methyl methanesulfonate, methyl, ethyl, propyl or butyl p-tosylate, or n- and isopropyl esters and n-, sec- and tert-butyl esters of benzenesulfonic acid, acrylates, acrylamide, benzyl chloride or 1-chlorobut-2-ene.

The preferred novel dyes of formula

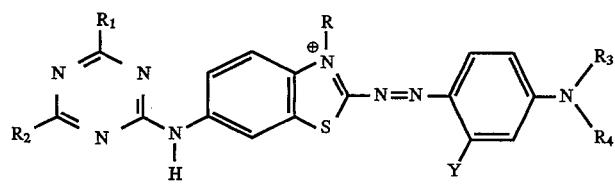
(7)

$An^{\ominus}$ are conveniently obtained by diazotising an amine of formula

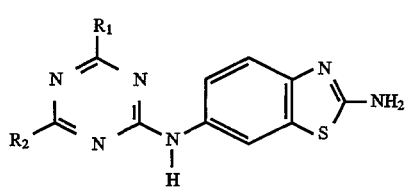
(12)

coupling the resultant diazo compound with a coupling component of formula

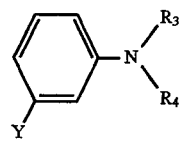
(13)

to a compound of formula

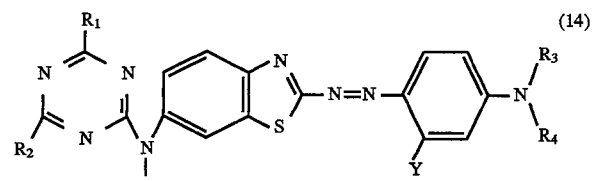
(14)

and quaternising the azo dye, in known manner, with a quaternising agent R-An, wherein X, Y, $R_3$, $R_4$, W, A, n, R and An have the meanings given for formulae (1) to (4).

The dyes of formula

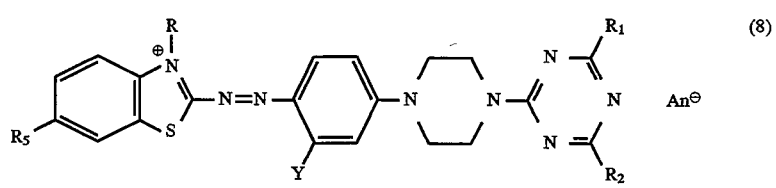
(8)

which are also preferred, are conveniently obtained by diazotising an amine of formula

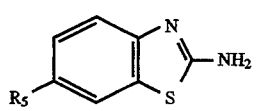
(15)

coupling the resultant diazo compound to a coupling component of formula

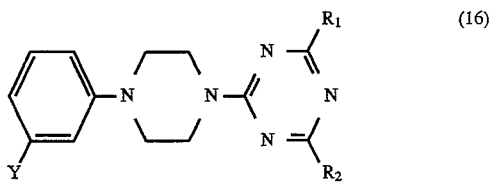

to give a compound of formula

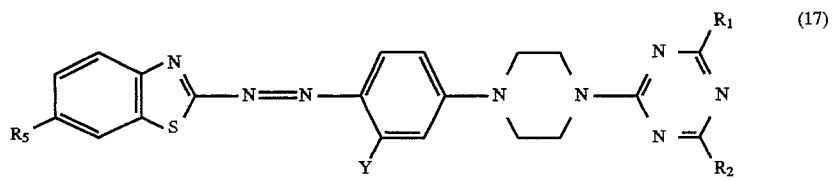

and quaternising the azo dye so obtained, in known manner, with a quaternising agent R-An, wherein $R_5$, Y, $R_1$, $R_2$, R and An are as defined for formulae (1) to (4).

The compounds of formulae (9), (10), (11), (12), (13), (15) and (16) are known or they can be prepared in per se known manner.

The dyes of formulae (1) and (2) according to the invention are especially suitable for dyeing paper, as they have a high substantivity for this substrate. There are obtained dyeings in blue or violet shades which have good fastness properties. Dyes carrying cationic charges, moreover, are especially suitable for dyeing wood containing paper (wood pulp). The waste water, in most cases, is completely colourless.

The dyes of formulae (1) and (2) can be formulated to solid or liquid physical forms and used for dyeing paper.

In powder or granular form the dyes are used preferably for batchwise mass dyeing in which the dye is added batchwise to the pulper, hollander or mixing chest. The dyes are preferably added as formulations which may contain extenders, e.g. urea as solubiliser, dextrins, Glauber's salt, sodium chloride, as well as dispersants, dust inhibitors and chelating agents such as tetrasodium pyrophosphate.

The invention accordingly also relates to solid dye formulations for dyeing paper, which formulations contain dyes of formulae (1) or (2).

In recent years the use of concentrated aqueous solutions of dyes has gained importance on account of the advantages which such solutions have over dyes in powder form. The use of solutions avoids the problems associated with dust formation, and the dyer is relieved of the time-consuming and often difficult operation of dissolving the dye powder in water. The use of dye solutions has, moreover, been promoted by the development of continuous processes for dyeing paper, as in such processes it is expedient to add the solution direct to the hollander or at any other suitable juncture in paper manufacture.

Hence the invention further relates to concentrated aqueous solutions of dyes of formula (1) or (2), which solutions contain not less than 5% by weight, typically 8 to 30% by weight, based on the total weight of the solution.

Concentrated aqueous solutions of dyes of formulae (1) or (2) can be prepared by filtering the dye suspension obtained in the synthesis of the dye, if appropriate effecting deionisation, conveniently by a membrane separation method, and stabilising the solution by the addition of auxiliaries such as urea, 6-caprolactam or polyethylene glycol. It is, however, also possible to suspend the isolated dye in hydrochloric acid, to filter the dye suspension once more and to mix the filter cake with lithium hydroxide or a suitable amine, typically an alkanolamine, and the requisite amount of water. Finally, it is also possible to carry out the coupling in the presence of LiOH, ammonia or alkanolamine, and to deionise the synthesis solution. Such dye solutions are suitable for dyeing paper pulp in the presence of rosin and alum size.

The dye solutions so obtained preferably contain, per 100 parts of dye, 400 to 900 parts of water, 0 to 200 parts of further auxiliaries such as urea, ε-caprolactam or polyethylene glycol, as well as 0 to 400 parts of an organic carboxylic acid, e.g. formic acid, acetic acid, propionic acid or lactic acid.

The novel aqueous concentrates, which are stable at storage temperatures of up to –5° C., are suitable for dyeing paper on which, with or without the use of a size, they give attractive blue or violet shades.

The dyes of formulae (1) and (2) can also be used for dyeing textile materials made of cellulose, e.g. cotton, as well as for dyeing leather and glass fibres.

In the following illustrative Examples parts and percentages are by weight.

Example 1: To 18.4 parts of cyanuric chloride in 300 parts of ice-water are added 12.2 parts of ethanolamine. The mixture is then warmed over 1 hour to 45° C. and stirred at this temperature until the reaction is complete. The pH is kept at c. 6 by addition of 2N aqueous sodium hydroxide.

To the resultant suspension are added 15.7 parts of 2,6-diaminobenzothiazole and the reaction mixture is heated for 1 hour to 75° C., the pH falling to 4–5. The partially precipitated product of formula

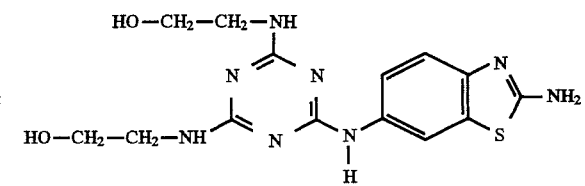

is fully precipitated by addition of sodium chloride and collected by suction filtration.

17.3 parts of 40% nitrosylsulfuric acid are added dropwise to a solution of 18.1 parts of this amine in 120 parts of 60% sulfuric acid at –10° C. over 30 minutes. The reaction mixture is then stirred for 1 hour at –10° to –5° C. and thereafter for 2 hours at –5° to 0° C. until diazotisation is complete. The resultant diazo solution is added dropwise over 15 minutes at 0°–8° C. to a solution of 9.8 parts of N-ethyl-N-hydroxyethyl-1,3-toluidine in 90 parts of ice-water and 8 parts of 100% sulfuric acid, and the pH is afterwards raised to c. 2 over 1 hour by addition of 50% aqueous sodium hydroxide. The temperature is kept at 8°–10° C. by addition of c. 130 parts of ice. When the coupling is complete, the pH is adjusted to 5–6 with aqueous sodium hydroxide to and the precipitated oily dye is crystallised by addition of methanol and stirring at 30°–40° C. The precipitate is then collected by suction filtration, washed with 500 parts of hot water and dried, affording 24 parts of azo base of the following formula

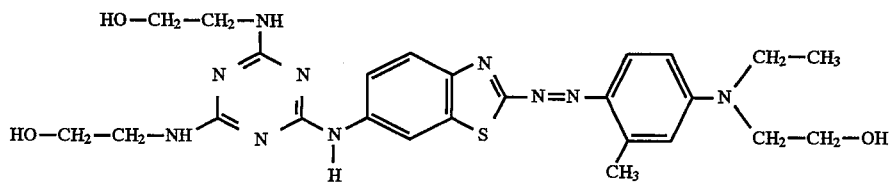

2.7 parts of dimethyl sulfate are added dropwise over 30 minutes to a suspension of 11 parts of this azo base, 50 parts of glacial acetic acid and 0.9 parts of magnesium oxide at 40° C. The suspension is stirred for 3 hours until quaternisation is complete. After addition of 5 parts of water, stirring is continued for 1 hour at 60° C. and the solvent is distilled off. The residue is taken up in 100 parts of water and the dye is precipitated by addition of 20 parts of sodium chloride. The precipitate is isolated by filtration and dried, affording 11.5 parts of the dye of the following formula

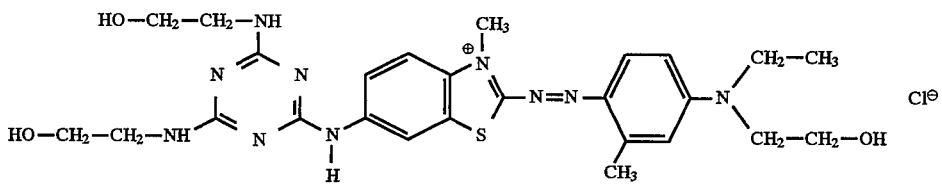

The dye dyes paper in a brilliant blue shade of excellent wetfastness. The wastewaters are colourless.

Examples 2–41: The following dyes are prepared in general accordance with the procedure described in Example 1. They dye paper in blue shades of good fastness properties.

| Ex. | $R_1$ | $R_2$ | $R_3$ | $R_4$ |
|-----|-------|-------|-------|-------|
| 2 | $NHC_2H_4OH$ | $NHC_2H_4OH$ | $CH_3$ | $C_2H_4OH$ |
| 3 | $NHC_2H_4OH$ | $NHC_2H_4OH$ | $CH_3$ | $CH_3$ |
| 4 | $NHC_2H_4OH$ | $NHC_2H_4OH$ | $C_2H_5$ | $C_2H_5$ |
| 5 | $NHC_2H_4OH$ | $NHC_2H_4OH$ | $C_2H_5$ | $C_2H_4CN$ |
| 6 | $NHC_2H_4OH$ | $NHC_2H_4OH$ | $C_2H_5$ | $C_2H_4Cl$ |
| 7 | $NHC_2H_4OH$ | $NHC_2H_4OH$ | $C_2H_5$ | $C_2H_4OCOCH_3$ |
| 8 | $NHC_2H_4OH$ | $NHC_2H_4OH$ | $C_2H_5$ | $C_2H_4OCH_3$ |
| 9 | $NHC_2H_4OH$ | $NHC_2H_4OH$ | $C_2H_5$ | $CH_2-CH(OH)-CH_3$ |
| 10 | $NHC_2H_4OH$ | $NHC_2H_4OH$ | $C_2H_5$ | $CH_2-CH(OH)-CH_2(OH)$ |
| 11 | $NHC_2H_4OH$ | $NHC_2H_4OH$ | $C_2H_5$ | $C_2H_4CONH_2$ |
| 12 | $NHC_2H_4OH$ | $NHC_2H_4OH$ | $C_2H_5$ | $C_2H_4COOCH_3$ |

-continued

Structure: A triazine group with R₁ and R₂ substituents connected via NH to a benzothiazolium (N-CH₃, Cl⁻ counterion) which is linked by azo (-N=N-) to a phenyl ring bearing CH₃ and N(R₃)(R₄).

| Ex. | R₁ | R₂ | R₃ | R₄ |
|---|---|---|---|---|
| 13 | NHC₂H₄OH | NHC₂H₄OH | C₂H₅ | CH₂-phenyl (benzyl) |
| 14 | NHC₂H₄OH | NHC₂H₄OH | C₂H₅ | phenyl |
| 15 | NHC₂H₄OH | NHC₂H₄OH | C₂H₅ | cyclohexyl (H) |
| 16 | NHC₂H₄OH | NHC₂H₄OH | C₂H₄CN | C₂H₄CN |
| 17 | NHC₂H₄OH | NHC₂H₄OH | C₂H₄OH | C₂H₄OH |
| 18 | NHC₂H₄OH | NHC₂H₄OH | C₂H₄OH | C₂H₄OCOCH₃ |
| 19 | NHC₂H₄OH | NHC₂H₄OH | C₂H₄Cl | C₂H₄Cl |
| 20 | NHC₂H₄OH | NHC₂H₄OH | C₂H₅ | CH₂-CH(OCH₃)-CH₃ |
| 21 | NHC₂H₄OH | NHC₂H₄OH | C₂H₅ | CH₂-CH(OCH₃)-CH₂-OCH₃ |
| 22 | NHC₂H₄OH | NHC₂H₄OH | C₂H₅ | CH₂-CH₂-N(CH₃)₂ |
| 23 | NHC₂H₄OH | NHCH₂CH₃ | C₂H₅ | CH₂-CH₂-OH |
| 24 | NHC₂H₄OH | N(CH₂CH₂OH)₂ | C₂H₅ | CH₂-CH₂-OH |
| 25 | NHC₂H₄OH | NH₂ | C₂H₅ | CH₂-CH₂-OH |
| 26 | N(CH₂CH₂OH)₂ | N(CH₂CH₂OH)₂ | C₂H₅ | CH₂-CH₂-OH |
| 27 | N(CH₂CH₂OH)₂ | NH-CH₃ | C₂H₅ | CH₂-CH₂-OH |
| 28 | N(CH₂CH₂OH)₂ | NH₂ | C₂H₅ | CH₂-CH₂-OH |
| 29 | N(CH₂CH₂OH)₂ | N(CH₂CH₃)₂ | C₂H₅ | CH₂-CH₂-OH |
| 30 | NHC₂H₄OC₂H₄OH | NHC₂H₄OC₂H₄OH | C₂H₅ | CH₂-CH₂-OH |
| 31 | NHC₂H₄OC₂H₄OH | NHCH₂CH₂OH | C₂H₅ | CH₂-CH₂-OH |
| 32 | NH-CH₂-CH(CH₃)-OH | NH-CH₂-CH(CH₃)-OH | C₂H₅ | CH₂-CH₂-OH |
| 33 | N(CH₃)-CH₂-CH₂-OH | N(CH₃)-CH₂-CH₂-OH | C₂H₅ | CH₂-CH₂-OH |
| 34 | NHCH₂CH₂OCH₃ | NHCH₂CH₂OCH₃ | C₂H₅ | CH₂-CH₂-OH |
| 35 | NHC₃H₆OCH₃ | NHC₃H₆OCH₃ | C₂H₅ | CH₂-CH₂-OH |
| 36 | NHC₃H₆OCH₃ | NHCH₂CH₂OH | C₂H₅ | CH₂-CH₂-OH |
| 37 | NHC₂H₄OC₂H₄OCH₃ | NHCH₂CH₂OH | C₂H₅ | CH₂-CH₂-OH |
| 38 | NHC₂H₄OH | NH-phenyl | C₂H₅ | CH₂-CH₂-OH |
| 39 | NHC₂H₄OH | morpholino (N-O ring) | C₂H₅ | CH₂-CH₂-OH |
| 40 | N(C₂H₄OH)₂ | N(C₂H₄OH)₂ | C₂H₅ | CH₂-CH₂-OH |
| 41 | N(C₂H₄OH)₂ | N(C₂H₄OH)₂ | C₂H₅ | CH₂-CH₂-CN |

Examples 42 and 43: The following dyes are prepared in general accordance with the procedure described in Example 1. They dye paper in blue shades of good fastness properties.

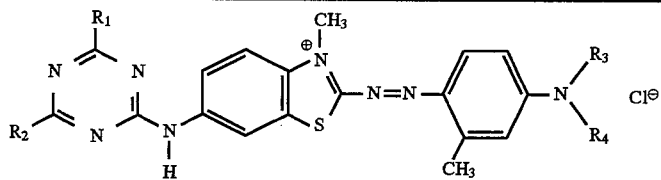

| Ex. | R₁ | R₂ | −N(R₃)(R₄) |
|---|---|---|---|
| 42 | NHC₂H₄OH | NHC₂H₄OH | −N(morpholino) |
| 43 | NHC₂H₄OH | NHC₂H₄OH | −N(piperazino-NH) |

Examples 44–46: The following dyes are prepared in general accordance with the procedure described in Example 1. They dye paper in blue shades of good fastness properties.

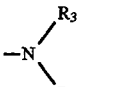

| Ex. | R₁ | R₂ | R₃ | R₄ |
|---|---|---|---|---|
| 44 | NHC₂H₄OH | NHC₂H₄OH | CH₃ | C₆H₅ |
| 45 | NHC₂H₄OH | NHC₂H₄OH | C₂H₅ | C₂H₄OH |
| 46 | NHC₂H₄OH | NHC₂H₄OH | C₂H₅ | C₂H₄CN |

Examples 47–52: The following dyes are prepared in general accordance with the procedure described in Example 1. They dye paper in blue shades of good fastness properties.

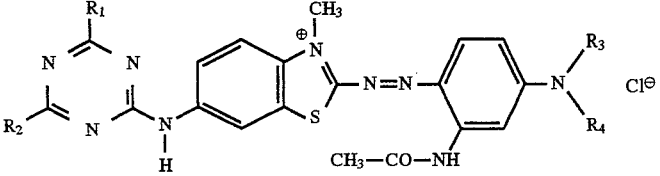

| Ex. | R₁ | R₂ | R₃ | R₄ |
|---|---|---|---|---|
| 47 | $NHC_2H_4OH$ | $NHC_2H_4OH$ | $C_2H_5$ | $C_2H_5$ |
| 48 | $NHC_2H_4OH$ | $NHC_2H_4OH$ | $C_2H_5$ | $C_2H_4OH$ |
| 49 | $NHC_2H_4OH$ | $NHC_2H_4OH$ | $C_2H_5$ | $C_2H_4CN$ |
| 50 | $N(C_2H_4OH)_2$ | $N(C_2H_4OH)_2$ | $C_2H_5$ | $C_2H_5$ |
| 51 | $N(C_2H_4OH)_2$ | $N(C_2H_4OH)_2$ | $C_2H_5$ | $C_2H_4OH$ |
| 52 | $N(C_2H_4OH)_2$ | $N(C_2H_4OH)_2$ | $C_2H_5$ | $C_2H_4CN$ |

Examples 53–58: The following dyes are prepared in general accordance with the procedure described in Example 1. They dye paper in blue shades of good fastness properties.

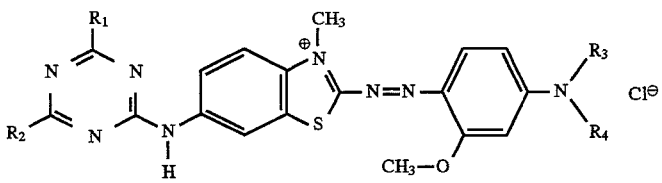

| Ex. | R₁ | R₂ | R₃ | R₄ |
|---|---|---|---|---|
| 53 | $NHC_2H_4OH$ | $NHC_2H_4OH$ | $C_2H_5$ | $C_2H_5$ |
| 54 | $NHC_2H_4OH$ | $NHC_2H_4OH$ | $C_2H_5$ | $C_2H_4OH$ |
| 55 | $NHC_2H_4OH$ | $NHC_2H_4OH$ | $C_2H_5$ | $C_2H_4CN$ |
| 56 | $N(C_2H_4OH)_2$ | $N(C_2H_4OH)_2$ | $C_2H_5$ | $C_2H_5$ |
| 57 | $N(C_2H_4OH)_2$ | $N(C_2H_4OH)_2$ | $C_2H_5$ | $C_2H_4OH$ |
| 58 | $N(C_2H_4OH)_2$ | $N(C_2H_4OH)_2$ | $C_2H_5$ | $C_2H_4CN$ |

Examples 59–64: The following dyes are prepared in general accordance with the procedure described in Example 1. They dye paper in blue shades of good fastness properties.

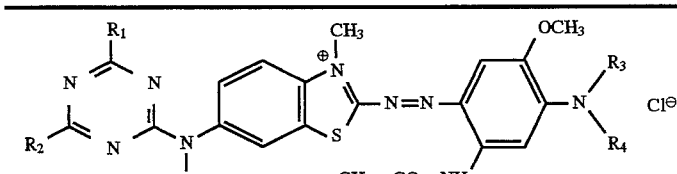

| Beisp. | R₁ | R₂ | R₃ | R₄ |
|---|---|---|---|---|
| 59 | $NHC_2H_4OH$ | $NHC_2H_4OH$ | $C_2H_5$ | $C_2H_5$ |
| 60 | $NHC_2H_4OH$ | $NHC_2H_4OH$ | $C_2H_5$ | $C_2H_4OH$ |
| 61 | $NHC_2H_4OH$ | $NHC_2H_4OH$ | $C_2H_5$ | $C_2H_4CN$ |
| 62 | $N(C_2H_4OH)_2$ | $N(C_2H_4OH)_2$ | $C_2H_5$ | $C_2H_5$ |
| 63 | $N(C_2H_4OH)_2$ | $N(C_2H_4OH)_2$ | $C_2H_5$ | $C_2H_4OH$ |
| 64 | $N(C_2H_4OH)_2$ | $N(C_2H_4OH)_2$ | $C_2H_5$ | $C_2H_4CN$ |

Examples 65–67: The following dyes are prepared in general accordance with the procedure described in Example 1. They dye paper in blue shades of good fastness properties.

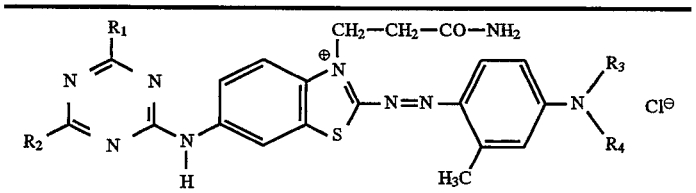

| Ex. | $R_1$ | $R_2$ | $R_3$ | $R_4$ |
|---|---|---|---|---|
| 65 | $NHC_2H_4OH$ | $NHC_2H_4OH$ | $C_2H_5$ | $C_2H_5$ |
| 66 | $NHC_2H_4OH$ | $NHC_2H_4OH$ | $C_2H_5$ | $C_2H_4OH$ |
| 67 | $NHC_2H_4OH$ | $NHC_2H_4OH$ | $C_2H_5$ | $C_2H_4CN$ |

Examples 68–73: The following dyes are prepared in general accordance with the procedure described in Example 1. They dye paper in blue shades of good fastness properties.

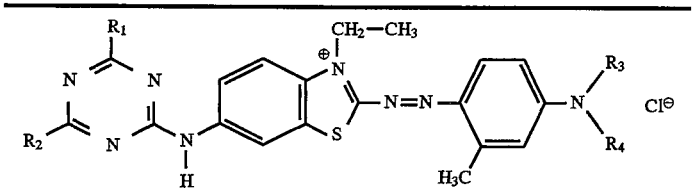

| Ex. | $R_1$ | $R_2$ | $R_3$ | $R_4$ |
|---|---|---|---|---|
| 68 | $NHC_2H_4OH$ | $NHC_2H_4OH$ | $C_2H_5$ | $C_2H_5$ |
| 69 | $NHC_2H_4OH$ | $NHC_2H_4OH$ | $C_2H_5$ | $C_2H_4OH$ |
| 70 | $NHC_2H_4OH$ | $NHC_2H_4OH$ | $C_2H_5$ | $C_2H_4CN$ |
| 71 | $N(C_2H_4OH)_2$ | $N(C_2H_4OH)_2$ | $C_2H_5$ | $C_2H_5$ |
| 72 | $N(C_2H_4OH)_2$ | $N(C_2H_4OH)_2$ | $C_2H_5$ | $C_2H_4OH$ |
| 73 | $N(C_2H_4OH)_2$ | $N(C_2H_4OH)_2$ | $C_2H_5$ | $C_2H_4CN$ |

Examples 74–79: The following dyes are prepared in general accordance with the procedure described in Example 1. They dye paper in blue shades of good fastness properties.

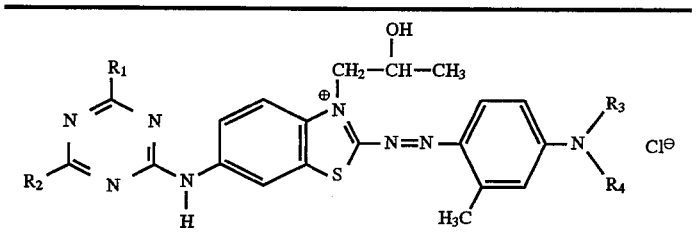

| Ex. | $R_1$ | $R_2$ | $R_3$ | $R_4$ |
|---|---|---|---|---|
| 74 | $NHC_2H_4OH$ | $NHC_2H_4OH$ | $C_2H_5$ | $C_2H_5$ |
| 75 | $NHC_2H_4OH$ | $NHC_2H_4OH$ | $C_2H_5$ | $C_2H_4OH$ |
| 76 | $NHC_2H_4OH$ | $NHC_2H_4OH$ | $C_2H_5$ | $C_2H_4CN$ |
| 77 | $N(C_2H_4OH)_2$ | $N(C_2H_4OH)_2$ | $C_2H_5$ | $C_2H_5$ |
| 78 | $N(C_2H_4OH)_2$ | $N(C_2H_4OH)_2$ | $C_2H_5$ | $C_2H_4OH$ |
| 79 | $N(C_2H_4OH)_2$ | $N(C_2H_4OH)_2$ | $C_2H_5$ | $C_2H_4CN$ |

Examples 80–96: The following dyes are prepared in general accordance with the procedure described in Example 1. They dye paper in blue shades of good fastness properties. They are particularly suitable for dyeing wood containig paper. If the substituents listed in the following Table carry a cationic charge, then the dyes additionally contain the corresponding number of anions.

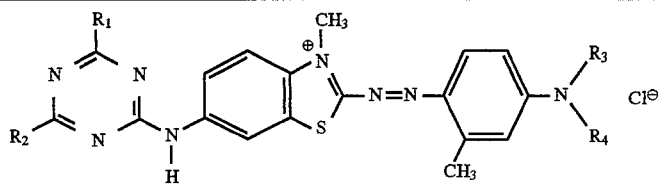

| Ex. | R₁ | R₂ | R₃ | R₄ |
|---|---|---|---|---|
| 80 | $NHC_2H_4OH$ | $NHC_2H_4OH$ | $C_2H_5$ | $CH_2-CH_2-\overset{\oplus}{N}(CH_3)_3$ |
| 81 | $NHC_2H_4OH$ | $NHC_2H_4OH$ | $C_2H_5$ | $CH_2CH_2-\overset{\oplus}{N}C_5H_5$ (pyridinium) |
| 82 | $NHC_2H_4OH$ | $NHC_2H_4OH$ | $C_2H_5$ | $C_2H_4-\overset{\oplus}{N}C_5H_4-CH_3$ (methylpyridinium) |
| 83 | $NHC_2H_4OH$ | $NHC_2H_4OH$ | $C_2H_5$ | $C_2H_4N(C_2H_4OH)_2$ |
| 84 | $NHC_2H_4OH$ | $NHC_2H_4OH$ | $C_2H_5$ | $\overset{\oplus}{C_2H_4N(C_2H_4OH)_3}$ |
| 85 | $NHC_2H_4OH$ | $NHC_2H_4OH$ | $C_2H_4N(CH_3)_2$ | $C_2H_4N(CH_3)_2$ |
| 86 | $NHC_2H_4OH$ | $NHC_2H_4OH$ | $\overset{\oplus}{C_2H_4N(C_2H_4OH)_3}$ | $\overset{\oplus}{C_2H_4N(C_2H_4OH)_3}$ |
| 87 | $NHC_2H_4OH$ | piperazine-$N-(CH_2)_2NH_2$ | $C_2H_5$ | $C_2H_4OH$ |
| 88 | $NHC_2H_4OH$ | $NHC_3H_6N(C_2H_5)_2$ | $C_2H_5$ | $C_2H_4N(CH_3)_2$ |
| 89 | $NHC_2H_4OH$ | $NHC_3H_6N(C_2H_5)_2$ | $C_2H_5$ | $CH_2CH_2-\overset{\oplus}{N}C_5H_5$ (pyridinium) |
| 90 | $NHC_2H_4OH$ | $NHC_3H_6N(CH_3)_2$ | $C_2H_4\overset{\oplus}{N}(CH_3)_3$ | $C_2H_4\overset{\oplus}{N}(CH_3)_3$ |
| 91 | $NHC_2H_4OH$ | $NHC_3H_6N(CH_3)_2$ | $C_2H_4N(CH_3)_2$ | $C_2H_4N(CH_3)_2$ |
| 92 | $NHC_3H_6N(C_2H_5)_2$ | $NHC_3H_6N(C_2H_5)_2$ | $C_2H_5$ | $C_2H_4OH$ |
| 93 | $NHCH_2-CH(CH_3)-NH_2$ | $NHCH_2-CH(CH_3)-NH_2$ | $C_2H_5$ | $C_2H_4OH$ |
| 94 | $NHC_3H_6N(C_2H_5)_2$ | $NHC_3H_6N(C_2H_5)_2$ | $C_2H_5$ | $C_2H_4N(CH_3)_2$ |
| 95 | $NHC_3H_6N(C_2H_5)_2$ | $NHC_3H_6N(C_2H_5)_2$ | $C_2H_5$ | $C_2H_4\overset{\oplus}{N}(CH_3)_3$ |
| 96 | $NHC_3H_6N(C_2H_5)_2$ | $NHC_3H_6N(C_2H_5)_2$ | $\overset{\oplus}{C_2H_4N(C_2H_4OH)_3}$ | $\overset{\oplus}{C_2H_4N(C_2H_4OH)_3}$ |

Examples 97–101: The following dyes are prepared in general accordance with the procedure described in Example 1 by replacing 2,6-diaminobenzothiazole with an equivalent amount of 2,6-diaminochlorobenzothiazole or 2,6-diaminobromobenzothiazole. They dye paper in blue shades of good fastness properties.

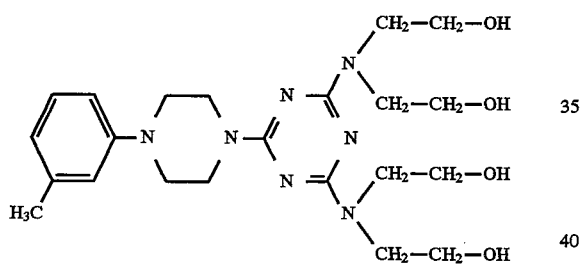

| Ex. | R₁ | R₂ | R₃ | Hal | R₄ |
|---|---|---|---|---|---|
| 97 | NHC₂H₄OH | NHC₂H₄OH | C₂H₅ | Cl | C₂H₄OH |
| 98 | NHC₂H₄OH | NHC₂H₄OH | CH₃ | Br | C₂H₄OH |
| 99 | NHC₂H₄OH | NHC₂H₄OH | C₂H₅ | Cl | C₂H₅ |
| 100 | NHC₂H₄OH | NHC₂H₄OH | C₂H₅ | Br | C₂H₄CN |
| 101 | NHC₂H₄OH | NHC₂H₄OH | C₂H₅ | Cl | C₂H₄Cl |

Example 102: 21 parts of diethanolamine are added to 18.4 parts of cyanuric chloride in 300 parts of ice-water. The mixture is then warmed to 45° C. over 1 hour and stirred at this temperature until the reaction is complete. The pH is kept at 6–7 by addition of 2N aqueous sodium hydroxide.

To the resultant suspension are added 16.7 parts of 1-(3-methylphenyl)piperazine and the reaction mixture is heated to 80°–85° C. and stirred until the condensation is complete. The pH is kept at 8.5–9 by addition of 2N aqueous sodium hydroxide. The precipitated oil is crystallised by cooling slowly with vigorous stirring and can be isolated by filtration to give 41 parts of the compound of the following formula:

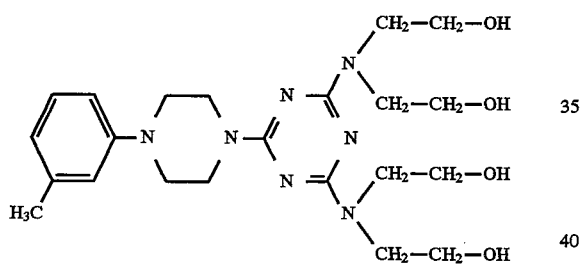

The general procedure as described in Example 1 is carried out by diazotising 6-methoxy-2-aminobenzothiazole and coupling the diazo compound to an equivalent amount of the above compound, followed by quaternisation with dimethyl sulfate to give the dye of formula

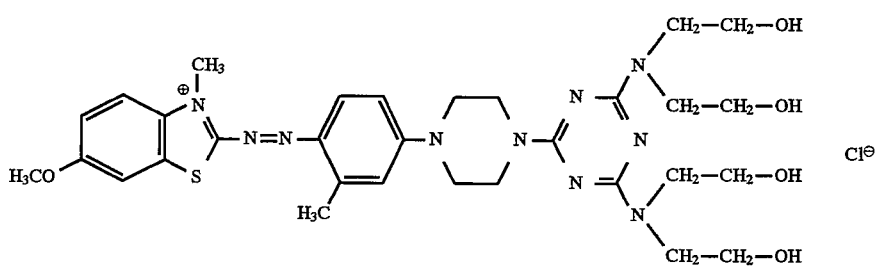

It dyes paper in a brilliant blue shade of excellent wet-fastness and exhausts fully on to paper.

Examples 103 to 134: The following dyes are prepared in general accordance with the procedure described in Example 102. They dye paper in blue shades of good fastness properties.

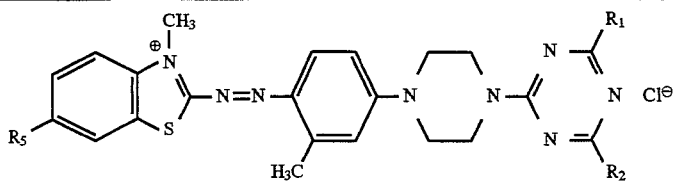

| Ex. | R₅ | R₁ | R₂ |
|---|---|---|---|
| 103 | OCH$_3$ | NHC$_2$H$_4$OH | NHC$_2$H$_4$OH |
| 104 | OCH$_3$ | NHC$_2$H$_4$OH | NHC$_2$H$_5$ |
| 105 | OCH$_3$ | NHC$_2$H$_4$OH | N(C$_2$H$_4$OH)$_2$ |
| 106 | OCH$_3$ | NHC$_2$H$_4$OH | NH$_2$ |
| 107 | OCH$_3$ | NHC$_2$H$_4$OH | —N(morpholino) |
| 108 | OCH$_3$ | N(C$_2$H$_4$OH)$_2$ | NHCH$_3$ |
| 109 | OCH$_3$ | N(C$_2$H$_4$OH)$_2$ | NH$_2$ |
| 110 | OCH$_3$ | N(C$_2$H$_4$OH)$_2$ | N(C$_2$H$_5$)$_2$ |
| 111 | OCH$_3$ | N(C$_2$H$_4$OH)$_2$ | NH—C$_6$H$_5$ |
| 112 | OCH$_3$ | NHC$_2$H$_4$OC$_2$H$_4$OH | NHC$_2$H$_4$OC$_2$H$_4$OH |
| 113 | OCH$_3$ | NHC$_2$H$_4$OC$_2$H$_4$OH | NH—CH$_2$—CH$_2$OH |
| 114 | OCH$_3$ | NH—CH$_2$—CH(CH$_3$)—OH | NH—CH$_2$—CH(CH$_3$)—OH |
| 115 | OCH$_3$ | N(CH$_3$)—CH$_2$—CH$_2$—OH | N(CH$_3$)—CH$_2$—CH$_2$—OH |
| 116 | OCH$_3$ | NHCH$_2$CH$_2$OCH$_3$ | NHCH$_2$CH$_2$OCH$_3$ |
| 117 | OCH$_3$ | NHC$_3$H$_6$OCH$_3$ | NHC$_3$H$_6$OCH$_3$ |
| 118 | OCH$_3$ | NHC$_2$H$_4$OC$_2$H$_4$OCH$_3$ | NHC$_2$H$_4$OC$_2$H$_4$OCH$_3$ |
| 119 | OC$_2$H$_5$ | NHC$_2$H$_4$OH | NHC$_2$H$_4$OH |
| 120 | OC$_2$H$_5$ | NHC$_2$H$_4$OH | NHC$_2$H$_5$ |
| 121 | OC$_2$H$_5$ | NHC$_2$H$_4$OH | N(C$_2$H$_4$OH)$_2$ |
| 122 | OC$_2$H$_5$ | NHC$_2$H$_4$OH | NH$_2$ |
| 123 | NHCOCH$_3$ | NHC$_2$H$_4$OH | —N(morpholino) |
| 124 | NHCOCH$_3$ | N(C$_2$H$_4$OH)$_2$ | NHCH$_3$ |
| 125 | NHCOCH$_3$ | N(C$_2$H$_4$OH)$_2$ | NH$_2$ |
| 126 | NHCOCH$_3$ | N(C$_2$H$_4$OH)$_2$ | N(C$_2$H$_5$)$_2$ |
| 127 | NH—CO—C$_6$H$_5$ | N(C$_2$H$_4$OH)$_2$ | NH—C$_6$H$_5$ |
| 128 | NH—CO—C$_6$H$_5$ | NHC$_2$H$_4$OC$_2$H$_4$OH | NHC$_2$H$_4$OC$_2$H$_4$OH |
| 129 | NH—CO—C$_6$H$_5$ | NHC$_2$H$_4$OC$_2$H$_4$OH | NH—CH$_2$—CH$_2$OH |
| 130 | NH—CO—C$_6$H$_5$ | NH—CH$_2$—CH(CH$_3$)—OH | NH—CH$_2$—CH(CH$_3$)—OH |

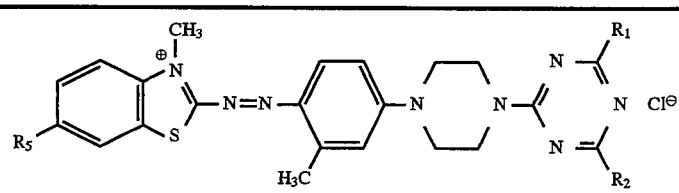

| Ex. | $R_5$ | $R_1$ | $R_2$ |
|---|---|---|---|
| 131 | NH—CO—NH—C₆H₅ | $\underset{\text{N—CH}_2\text{—CH}_2\text{—OH}}{\text{CH}_3}$ | $\underset{\text{N—CH}_2\text{—CH}_2\text{—OH}}{\text{CH}_3}$ |
| 132 | NH—CO—NH—C₆H₅ | NHCH₂CH₂OCH₃ | NHCH₂CH₂OCH₃ |
| 133 | NH—CO—NH—C₆H₅ | NHC₃H₆OCH₃ | NHC₃H₆OCH₃ |
| 134 | NH—CO—NH—C₆H₅ | NHC₂H₄OC₂H₄OCH₃ | NHC₂H₄OC₂H₄OCH₃ |

Examples 135–140: The following dyes are prepared in general accordance with the procedure described in Example 102 by replacing 6-methoxy-2-aminobenzothiazole with an equivalent amount of the analogous 2-aminochlorobenzothiazoles or 2-aminobromobenzothiazoles. They dye paper in blue shades of good fastness properties.

Examples 141 to 152: The general procedure described in Example 1 is repeated, but terminating the synthesis after the preparation of the azo base, i.e. without effecting quaternisation, to give the following dyes which dye paper in brilliant violet shades of good lightfastness and good wetfastness properties, and which exhaust fully on to paper.

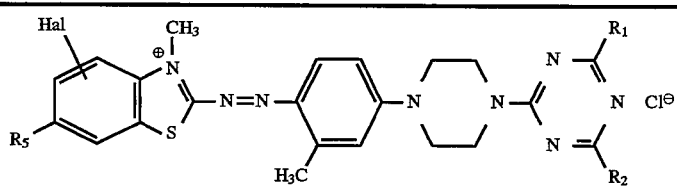

| Ex. | $R_5$ | Hal | $R_1$ | $R_2$ |
|---|---|---|---|---|
| 135 | NHCOCH₃ | Cl | NHC₂H₄OH | morpholino (N—O ring) |
| 136 | NHCOCH₃ | Br | N(C₂H₄OH)₂ | NHCH₃ |
| 137 | NH—CO—C₆H₅ | Cl | N(C₂H₄OH)₂ | NH—C₆H₅ |
| 138 | NH—CO—C₆H₅ | Br | NHC₂H₄OC₂H₄OH | NHC₂H₄OC₂H₄OH |
| 139 | OCH₃ | Cl | $\underset{\text{N—CH}_2\text{—CH}_2\text{—OH}}{\text{CH}_3}$ | $\underset{\text{N—CH}_2\text{—CH}_2\text{—OH}}{\text{CH}_3}$ |
| 140 | OCH₃ | Br | NHCH₂CH₂OCH₃ | NHCH₂CH₂OCH₃ |

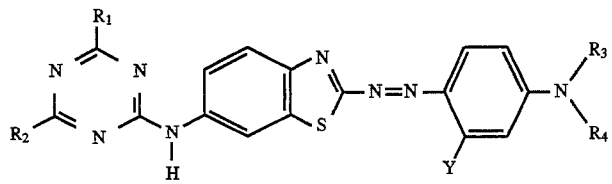

| Ex. | $R_1$ | $R_2$ | Y | $R_3$ | $R_4$ |
|---|---|---|---|---|---|
| 141 | $NHC_3H_6N(C_2H_5)_2$ | $NHC_3H_6N(C_2H_5)_2$ | H | $C_2H_5$ | $C_2H_4OH$ |
| 142 | $NHC_3H_6N(CH_3)_2$ | $NHC_3H_6N(CH_3)_2$ | $CH_3$ | $C_2H_5$ | $C_2H_4OH$ |
| 143 | $NHC_3H_6N(C_2H_5)_2$ | $NHC_2H_4N(C_2H_5)_2$ | $CH_3$ | $C_2H_5$ | $C_2H_4N(C_2H_4OH)_2$ |
| 144 | $NHC_3H_6N(C_2H_5)_2$ | $NHC_2H_4N(C_2H_5)_2$ | $CH_3$ | $C_2H_5$ | $C_2H_4-\overset{\oplus}{N}(C_2H_4OH)_2\text{ }|\text{ }CH_3$ |
| 145 | $NHC_3H_6N(CH_3)_2$ | $NHC_3H_6N(CH_3)_2$ | $CH_3$ | $C_2H_5$ | $C_2H_5$ |
| 146 | $NHC_2H_4OH$ | $NHC_3H_6N(C_2H_5)_2$ | $CH_3$ | $C_2H_5$ | $C_2H_4-\overset{\oplus}{N}(C_2H_4OH)_3$ |
| 147 | $NHC_2H_4OH$ | $NHC_2H_4OH$ | $CH_3$ | $C_2H_5$ | $C_2H_4-\overset{\oplus}{N}(C_2H_4OH)_3$ |
| 148 | $NHC_3H_6N(C_2H_5)_2$ | $NHC_3H_6N(C_2H_5)_2$ | $OCH_3$ | $C_2H_5$ | $C_2H_4OH$ |
| 149 | $NHC_2H_4OH$ | $NHC_2H_4OH$ | $OCH_3$ | $C_2H_4OH$ | $C_2H_4-\overset{\oplus}{N}(C_2H_4OH)_3$ |
| 150 | $NHC_3H_6N(C_2H_5)_2$ | $NHC_3H_6N(C_2H_5)_2$ | $OCH_3$ | $C_2H_5$ | $C_2H_4N(C_2H_4OH)_2$ |
| 151 | $NHC_3H_6N(C_2H_5)_2$ | $NHC_3H_6N(C_2H_5)_2$ | $NHCOCH_3$ | $C_2H_5$ | $C_2H_4OH$ |
| 152 | $NHC_2H_4OH$ | $NHC_2H_4OH$ | $CH_3$ | $C_2H_5$ | $CH_2-CH(OH)-CH_2-\overset{\oplus}{N}(CH_3)_3$ |
| 152a | $NHCH_2CH(CH_3)NH_2$ | $NHCH_2CH(CH_3)NH_2$ | $CH_3$ | $C_2H_5$ | $C_2H_4OH$ |

Example 153: The dye of the following formula

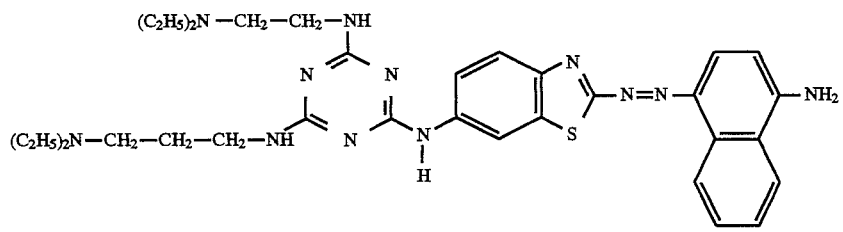

is also obtained in accordance with the procedures of Examples 141 to 152. It too dyes paper brilliant violet shade of good lightfastness and good wetfastness properties, and exhausts fully on paper.

Examples 154 to 160: The general procedure described in Example 102 is repeated, but terminating the synthesis after the preparation of the azo base, i.e. without effecting quaternisation, to give the following dyes which dye paper in brilliant violet shades of good lightfastness and good wetfastness properties, and which exhaust fully on to paper.

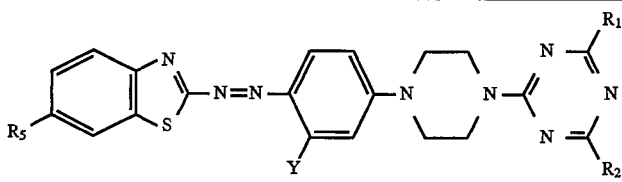

| Ex. | R₅ | Y | R₁ | R₂ |
|---|---|---|---|---|
| 154 | OCH₃ | CH₃ | NHC₃H₆N(C₂H₅)₂ | NHC₃H₆N(C₂H₅)₂ |
| 155 | OCH₃ | CH₃ | NHC₃H₆N(CH₃)₂ | NHC₃H₆N(CH₃)₂ |
| 156 | OCH₃ | CH₃ | N⏜N—CH₂CH₂NH₂ | N⏜N—CH₂CH₂NH₂ |
| 157 | H | CH₃ | NHC₃H₆N(C₂H₅)₂ | NHCH₂CH₂OH |
| 158 | OCH₃ | OCH₃ | NHC₃H₆N(C₂H₅)₂ | NHC₃H₆N(C₂H₅)₂ |
| 159 | OCH₃ | NHCOCH₃ | NHC₃H₆N(C₂H₅)₂ | NHC₃H₆N(C₂H₅)₂ |
| 160 | OC₂H₅ | OCH₃ | NHC₃H₆N(C₂H₅)₂ | NHC₃H₆N(C₂H₅)₂ |

Examples 161 and 162: The following dyes are prepared in general accordance with the procedure described in Examples 154 to 160. They also dye paper in brilliant violet shades of good lightfastness and good wetfastness properties and exhaust fully on to paper.

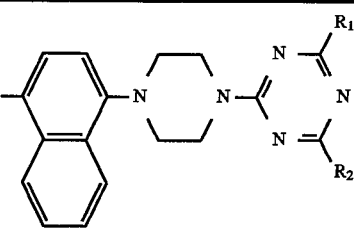

| Ex. | R₅ | R₁ | R₂ |
|---|---|---|---|
| 161 | H | NHC₃H₆N(C₂H₅)₂ | NHC₃H₆N(C₂H₅)₂ |
| 162 | OCH₃ | NHC₃H₆N(C₂H₅)₂ | NHC₃H₆N(C₂H₅)₂ |

Example 163: 8.5 parts of N-phenylpiperazine are added dropwise to 23 parts of the azo dye of formula

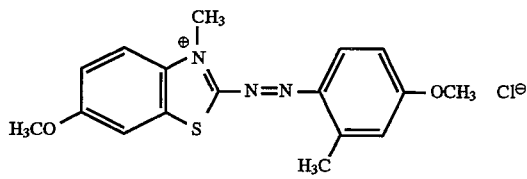

(prepared in conventional manner) in 100 parts of methanol, and the suspension is stirred for 1 hour at 25°–30° C. Yield: 20 parts of the dye of formula

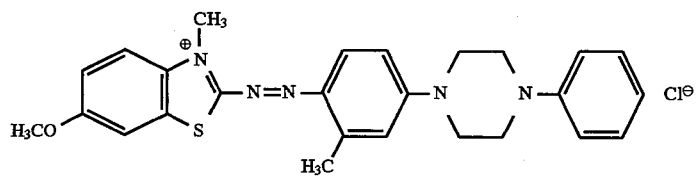

It dyes paper in a brilliant blue shade with excellent uptake and good fastness properties.

Examples 164 to 171: The following dyes are prepared in general accordance with the procedure described in Example 163. They dye paper in blue shades of good fastness properties.

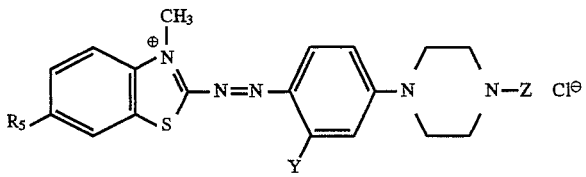

| Ex. | R₅ | Y | Z |
|---|---|---|---|
| 164 | OCH₃ | CH₃ | *m-tolyl* |
| 165 | OCH₃ | CH₃ | *1-naphthyl* |
| 166 | OCH₃ | CH₃ | *4-(6-methylbenzothiazol-2-yl)phenyl* |
| 167 | NH—CO—C₆H₅ | CH₃ | *phenyl* |
| 168 | *2,4-bis(2-hydroxyethylamino)-1,3,5-triazin-6-yl amino* | CH₃ | *m-tolyl* |
| 169 | OCH₃ | CH₃ | CO—C₆H₅ |
| 170 | OCH₃ | CH₃ | CO—NH—C₆H₅ |
| 171 | OCH₃ | CH₃ | *benzothiazol-2-yl* |

Example 172: The procedure as described in Example 163 is repeated, but replacing 8.5 parts of N-phenylpiperazine with an equivalent amount of p-phenylenediamine, to give the dye of formula It dyes paper in a greenish-blue shade with excellent uptake and good fastness properties.

Examples 173 to 175: The following dyes are prepared in general accordance with the procedure described in Example

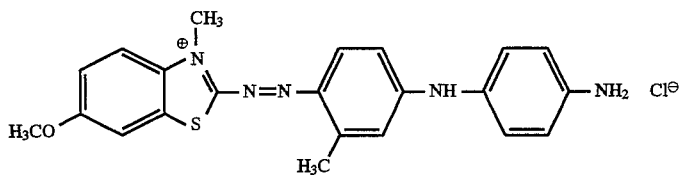

1 by using tetrachloropyrimidine instead of cyanuric chloride. They dye paper in blue shades of good fastness properties.

| Ex. | R₁ | R₂ | Y | R₄ |
|---|---|---|---|---|
| 173 | NHC₂H₄OH | NHC₂H₄OH | CH₃ | C₂H₄OH |
| 174 | NHC₂H₄OH | NHC₂H₄OH | H | C₂H₄OH |
| 175 | N(C₂H₄OH)₂ | N(C₂H₄OH)₂ | CH₃ | C₂H₄OH |

Examples 176 and 177: The following dyes are prepared in general accordance with the procedure described in Example 102 by using tetrachloropyrimidine instead of cyanuric chloride. They dye paper in blue shades of good fastness properties.

| Ex. | R₅ | R₁ | R₂ |
|---|---|---|---|
| 176 | OCH₃ | NHC₂H₄OH | NHC₂H₄OH |
| 177 | OCH₃ | N(C₂H₄OH)₂ | N(C₂H₄OH)₂ |

Examples 178 and 179: The following dyes are prepared in general accordance with the procedure described in Example 1 by using dichloroquinoxalinecarbonyl chloride instead of cyanuric chloride. They dye paper in blue shades of good fastness properties.

| Ex. | R₁ | R₂ | Y | R₄ |
|---|---|---|---|---|
| 178 | NHC₂H₄OH | NHC₂H₄OH | CH₃ | C₂H₄OH |
| 179 | N(C₂H₄OH)₂ | N(C₂H₄OH)₂ | H | C₂H₅ |

Examples 180 and 181: The following dyes are prepared in general accordance with the procedure described in Example 102 by using dichloroquinoxalinecarbonyl chloride instead of cyanuric chloride. They dye paper in blue shades of good fastness properties.

| Ex. | R₁ | R₂ | Y | R₅ |
|---|---|---|---|---|
| 180 | NHC₂H₄OH | NHC₂H₄OH | H | OCH₃ |
| 181 | N(C₂H₄OH)₂ | N(C₂H₄OH)₂ | CH₃ | OCH₃ |

Examples 182 and 184: The following dyes are prepared in general accordance with the procedure described in Example 1 or 102. They dye paper in blue shades of good fastness properties.

| Ex. | R₅ | Y | Z |
|---|---|---|---|
| 182 | NH—CO—C₆H₅ | CH₃ | —CO—C₆H₅ |
| 183 | triazine with HNC₂H₄OH, HN, HNC₂H₄OH substituents | H | triazine with HNCH₂H₄OH, HNC₂H₄OH substituents |
| 184 | NH—CO—C₆H₅ | CH₃ | triazine with N(C₂H₄OH)₂, N(C₂H₄OH)₂ substituents |

Examples 185 to 188: The following dyes are prepared in general accordance with the procedure described in Example 102 by replacing 1-(3-methylphenyl)piperazine with an equivalent amount of the analogous phenylpiperazine which is substituted in the 3-position of the phenyl group. They dye paper in blue shades of good fastness properties.

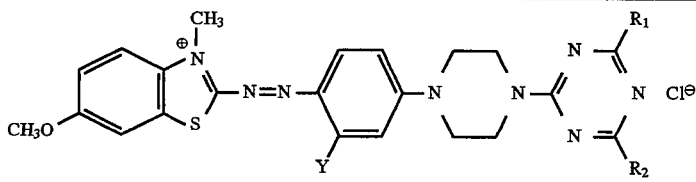

| Ex. | Y | R₁ | R₂ |
|---|---|---|---|
| 185 | H | NHC₂H₄OH | NHC₂H₄OH |
| 186 | H | N(C₂H₄OH)₂ | N(C₂H₄OH)₂ |
| 187 | OCH₃ | NHC₂H₄OH | NHC₂H₄OH |
| 188 | NHCOCH₃ | NHC₂H₄OH | NHC₂H₄OH |

Examples 189 to 191: The following dyes are prepared in general accordance with the procedure described in Example 102 by replacing 6-methoxy-2-aminobenzothiazole with an equivalent amount of 2-aminonaphthothiazole. They dye paper in blue shades of good fastness properties.

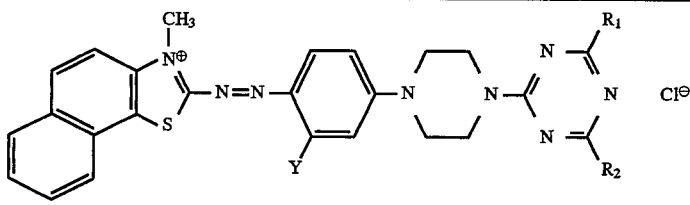

| Ex. | Y | R₁ | R₂ |
|---|---|---|---|
| 189 | CH₃ | NHC₂H₄OH | NHC₂H₄OH |
| 190 | CH₃ | N(C₂H₄OH)₂ | N(C₂H₄OH)₂ |
| 191 | H | NHC₂H₄OH | N(C₂H₄OH)₂ |

Example 192: 50 parts of chemically bleached beech sulfite cellulose are mixed with 50 parts of bleached pine cellulose RKN 15 (freeness 22° SR) and 2 parts of the dye of Example 1 in water (pH 6, water hardness 10° dH, temperature 20°, liquor ratio 1:40). After stirring for 15 minutes, paper sheets are prepared on a Frank sheet former.

The paper is dyed in a deep blue shade. The wastewater is completely colourless. Exhaustion is almost 100%. The wetfastness properties are excellent.

Example 193: A paper web of bleached beech sulfite cellulose (22° SR) is prepared on a continuous laboratory paper machine. Ten seconds before pulping, an aqueous solution of the dye of Example 1 is metered continuously to the low-density stock with vigorous turbulence (0.5% dye, liquor ratio 1:400, water hardness 10° dH, pH 6, temperature 20°).

The paper web is dyed in a blue shade of medium intensity. The wastewater is completely colourless.

Example 194: In general accordance with the procedure of Example 192, 100 parts of groundwood pulp are dyed with 2 parts of the dye of Example 80. The resultant blue dyeing has good fastness properties. The wastewater is completely colourless.

Examples 195 to 197: Paper dyed in a deep blue shade is also obtained by repeating the procedure described in Example 192, but using equivalent amounts of the following dyes:

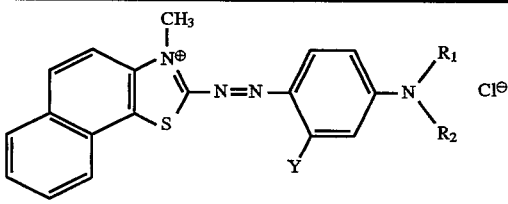

| Ex. | Y | R₁ | R₂ |
|---|---|---|---|
| 195 | CH₃ | C₂H₄OH | C₂H₅ |
| 196 | CH₃ | C₂H₄OH | C₂H₄OH |
| 197 | CH₃ | C₂H₅ | C₂H₅ |

The dyes are prepared by conventional methods.

What is claimed is:

1. An azo dye of formula

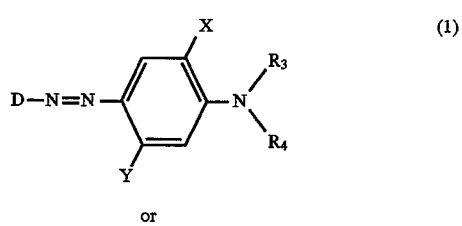

(1)

or

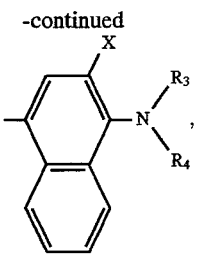

wherein

D is a radical of a diazo component of formula

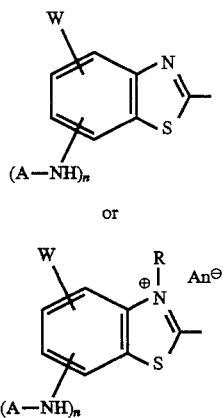

wherein

A is a radical of the formula

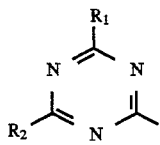

wherein $R_1$ and $R_2$ are each independently of the other halogen, hydroxy, alkoxy, alkylthio, amino, alkylamino, dialkylamino, arylamino, piperidino or morpholino, W is halogen, alkyl, alkoxy, carboxy, alkanoylamino, arylamino, arylcarbonylamino or arylureido, R is alkyl, $An^\ominus$ is a colourless anion, and n is 0 or 1, X is hydrogen, alkyl or alkoxy, Y is hydrogen, alkyl, alkoxy, alkanoylamino, arylcarbonylamino or arylureido, $R_3$ is hydrogen or alkyl, $R_4$ is hydrogen, alkyl, cycloalkyl or aryl, or $R_3$ and $R_4$, together with the linking N-atom, is a pyrrolidino, piperidino, morpholino or piperazino ring, which piperazino ring is unsubstituted at the N atom which is not linked to the coupling component, or is substituted by alkyl, arylcarbonyl, arylaminocarbonyl, benzothiazolyl, benzothioazolylaryl, or by an aromatic carbocyclic or heterocyclic radical, with the proviso that n is 1 if $R_4$ or the ring formed by —$NR_3R_4$ does not contain an aromatic carbocyclic or heterocyclic ring as substituent and with the further proviso that, if n is 0, $R_3$ and $R_4$, together with the linking N-atom, form a piperazino ring which is substituted at the N atom which is not linked to the coupling component by a radical A.

2. A dye according to claim 1, wherein $R_1$ and $R_2$ are each independently of the other halogen, amino, $C_1$-$C_4$alkylamino, di-$C_1$-$C_4$alkylamino, phenylamino or morpholino, the alkyl moieties of which alkylamino groups are unsubstituted or substituted by hydroxy, carboxy, halogen, cyano, $C_1$-$C_4$alkoxy or hydroxy-substituted $C_1$-$C_4$alkoxy; by amino, alkylamino, dialkylamino, aminocarbonyl, phenyl, phenoxy or phenylaminocarbonyl, the phenyl group in which three last mentioned radicals is unsubstituted or substituted by $C_1$-$C_4$alkyl, $C_1$-$C_4$alkoxy or phenoxy; or by cationic trialkylammonium or pyridinium radicals.

3. A dye according to claim 1, wherein $R_1$ and $R_2$ are each independently of the other methylamino, ethylamino, hydroxyethylamino, dihydroxyethylamino, hydroxypropylamino, hydroxyisopropylamino, methoxyethylamino, methoxypropylamino, hydroxyethoxyethylamino, methoxyethoxyethylamino, dimethylaminoethylamino, dimethylaminopropylamino, diethylaminoethylamino, diethylaminopropylamino, aminoethylamino, 2-aminopropylamino, 4-aminoethylpiperazino, 4-hydroxyethylpiperazino, phenylamino or morpholino.

4. A dye according to claim 3, wherein $R_1$ and $R_2$ have the same meaning.

5. A dye according to claim 3, wherein $R_1$ and $R_2$ are each hydroxyethylamino or dihydroxyethylamino.

6. A dye according to claim 1, wherein W in the diazo component of formula (3) or (4) is chloro, bromo, $C_1$-$C_4$alkyl, $C_1$-$C_4$alkoxy, acetylamino, benzoylamino or phenylureido.

7. A dye according to claim 1 of formula (1), wherein D is a cationic radical of formula (4).

8. A dye according to claim 1, wherein the anion $An^\ominus$ is chloride, hydrogensulfate, sulfate, methosulfate, phosphate, formate, lactate or acetate.

9. A dye according to claim 1, wherein R is unsubstituted $C_1$-$C_4$alkyl or $C_1$-$C_4$alkyl which is substituted by hydroxy, phenyl or aminocarbonylethyl.

10. A dye according to claim 1, wherein X is hydrogen, $C_1$-$C_4$alkyl or $C_1$-$C_4$alkoxy.

11. A dye according to claim 1, wherein Y is hydrogen, $C_1$-$C_4$alkyl, $C_1$-$C_4$alkoxy or $C_1$-$C_4$alkylcarbonylamino.

12. A dye according to claim 11, wherein Y is hydrogen, methyl, methoxy or acetylamino.

13. A dye according to claim 1, wherein $R_3$ and $R_4$ are each independently of the other unsubstituted $C_1$-$C_4$alkyl or $C_1$-$C_4$alkyl which is substituted by hydroxy, chloro, cyano, $C_1$-$C_4$alkoxy, $C_1$-$C_4$alkoxycarbonyl, $C_1$-$C_4$alkylcarbonyloxy, carboxamido, phenyl, amino, monoalkylamino, dialkyamino or trialkylammonium, and the alkyl moieties of the alkylamino groups may likewise be substituted by the same substituents.

14. A dye according to claim 1, wherein $R_3$ and $R_4$ together are a piperazino radical of formula

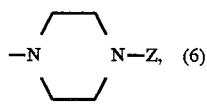

wherein

Z is a radical A as defined for formulae (3) and (4) in claim 1, or is an aryl radical.

15. A dye according to claim 14, wherein Z is a radical of formula

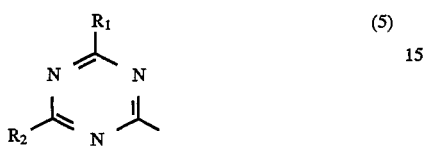

wherein $R_1$ and $R_2$ are each independently of the other halogen, hydroxy, alkoxy, alkylthio, amino, alkylamino, dialkylamino, arylamino, piperidino or morpholino, or a phenyl or naphthyl radical which is unsubstituted or substituted by $C_1$–$C_4$alkyl or by 1,3-benzothiazol-2-yl, or is phenylcarbonyl, phenylaminocarbonyl or 1,3-benzothiazol-2-yl.

16. A dye of formula

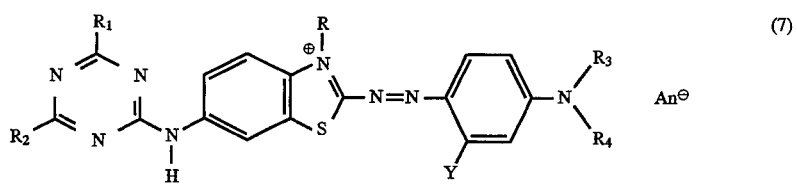

or

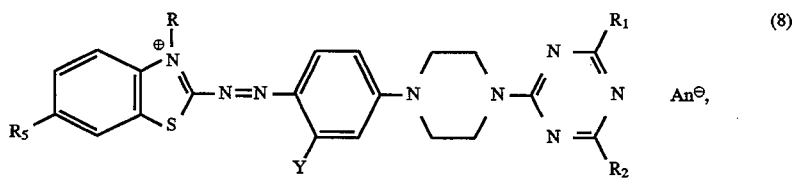

wherein $R_1$ and $R_2$ are each independently of the other halogen, hydroxy, alkoxy, alkylthio, amino, alkylamino, dialkylamino, arylamino, piperidino or morpholino, R is unsubstituted $C_1$–$C_4$alkyl or $C_1$–$C_4$alkyl which is substituted by hydroxy, phenyl or aminocarbonylethyl, Y is hydrogen, $C_1$–$C_4$alkyl, $C_1$–$C_4$alkoxy or $C_1$–$C_4$alkylcarbonylamino, $R_3$ and $R_4$ are each independently of the other unsubstituted $C_1$–$C_4$alkyl or $C_1$–$C_4$alkyl which is substituted by hydroxy, chloro, cyano, $C_1$–$C_4$alkoxy, $C_1$–$C_4$alkoxycarbonyl, $C_1$–$C_4$alkylcarbonyloxy, carboxamido, phenyl, amino, monoalkylamino, dialkyamino or trialkylammonium, and the alkyl moieties of the alkylamino groups are unsubstituted or substituted by the cited substituents, $R_5$ is hydrogen, $C_1$–$C_4$alkyl, $C_1$–$C_4$alkoxy, $C_1$–$C_4$alkylcarbonylamino, phenylcarbonylamino or phenylureido and $An^\ominus$ is a colourless anion.

17. A process for dyeing paper, which comprises treating paper with a dye of formula (1) or (2) as claimed in claim 1.

18. The dyed paper obtained by the process as claimed in claim 17.

19. A solid dye formulation for dyeing paper which contains at least one dye as claimed in claim 1 and an extender.

20. A liquid dye formulation for dyeing paper which contains at least one dye as claimed in claim 1 in an aqueous liquid medium.

* * * * *